INVENTOR.
ERIC C. HOPKINSON
ALEXANDER B. C. MARSHALL
BY
E. F. Bard
ATTORNEY

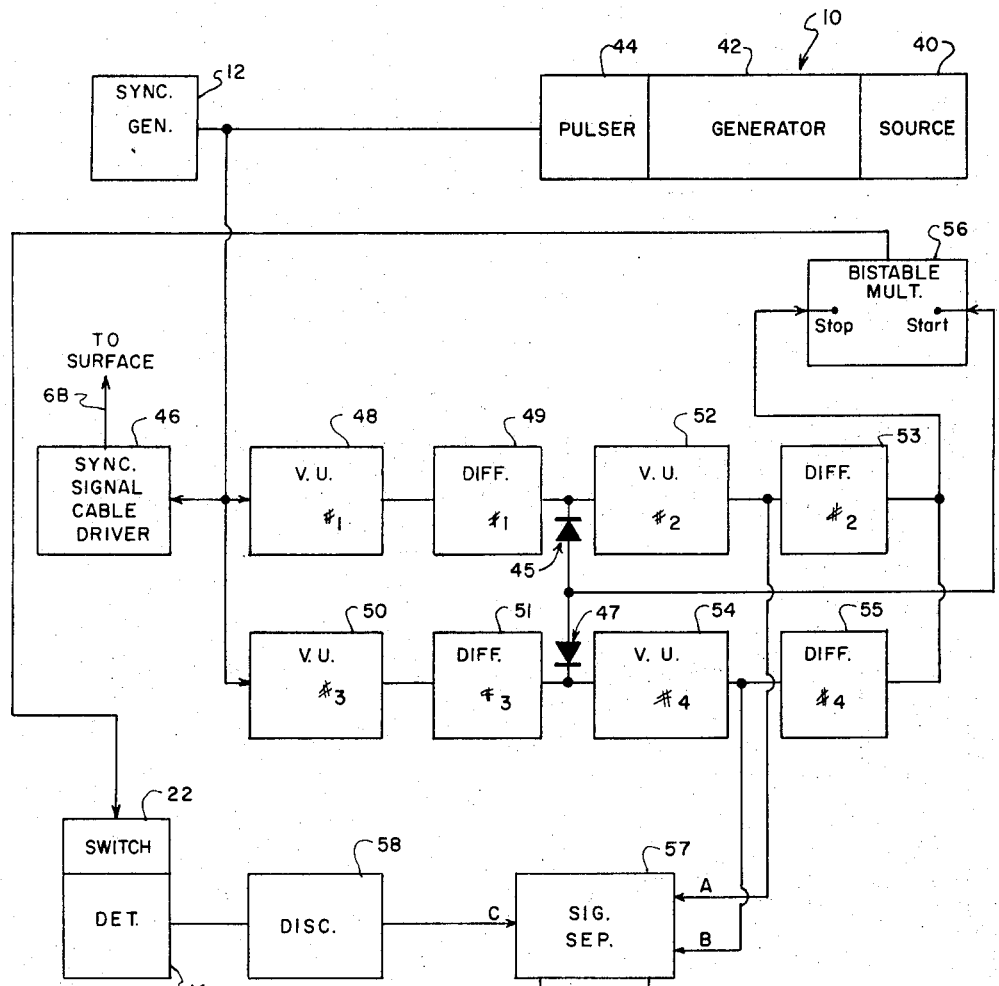
FIG. 2
*INVENTOR.*
ERIC C. HOPKINSON
ALEXANDER B.C. MARSHALL
BY
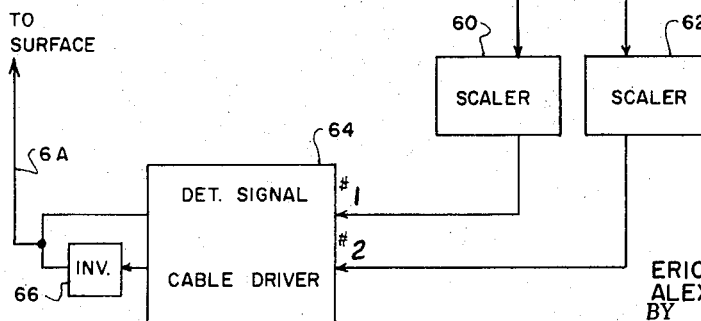
ATTORNEY INVENTOR.
ERIC C. HOPKINSON
ALEXANDER B. C. MARSHALL
BY
E. F. Bard
ATTORNEY Dec. 12, 1967  E. C. HOPKINSON ET AL  3,358,142
DETECTOR GATING SYSTEM EMPLOYED IN A
PULSED NEUTRON LOGGING SYSTEM
Filed April 20, 1964  5 Sheets-Sheet 5

United States Patent Office 3,358,142
Patented Dec. 12, 1967

3,358,142
DETECTOR GATING SYSTEM EMPLOYED IN A PULSED NEUTRON LOGGING SYSTEM
Eric C. Hopkinson and Alexander B. C. Marshall, Houston, Tex., assignors to Dresser Industries, Inc., Dallas, Tex., a corporation of Delaware
Filed Apr. 20, 1964, Ser. No. 361,159
10 Claims. (Cl. 250—71.5)

This invention relates to radioactivity well logging systems employing a pulsed source of neutrons, and is particularly directed to a gating system employed in a pulsed neutron logging system for activating the detector for two or more preselected portions of the time occurring between successive neutron pulses.

Radioactivity well logging systems for investigating the character of subsurface earth formations are now well known in the oil and gas industry. These systems are of various design, depending upon the measurement sought to be obtained, and may include sources of either gamma or neutron radiation as well as one or more radiation detectors.

Recently, improved radioactivity logging systems of the type described in an application for Letters Patent filed July 5, 1963, by A. H. Youmans, and bearing Ser. No. 292,927, now abandoned, have been perfected and introduced commercially to the petroleum industry. Broadly speaking, such systems include a source of fast neutrons axially spaced from a linear array of one or more radiation detectors, at least one of which is rendered primarily responsive to gamma rays. A system of this character further includes provision for intermittently pulsing the neutron source so as to produce the neutrons in bursts or "pulses," rather than as a steady stream, as well as provision for rendering such detector or detectors responsive to incident radiation only during one or more preselected portions of the time subsisting between successive pulses of neutrons. In general, it is the purpose of such systems to irradiate an adjacent earth formation in a manner to create in it a population of thermal neutrons, and to measure the rate at which the thermal neutron population declines, so as to measure the hydrogeniety of the irradiated formation.

Systems of the foregoing character are generally provided with static atmosphere deuterium ion accelerators, as their sources of neutrons, such as that depicted and described in Letters Patent No. 2,689,918, which issued Sept. 21, 1954 to A. H. Youmans. A neutron source of this character may be pulsed at frequencies of 500–5,000 pulses per second, and therefore the time interval between successive neutron pulses is very short. Furthermore, the simplest way of measuring the decline rate of the thermal neutron population is to measure the intensity of capture gamma rays occurring during two or more preselected equal time intervals between successive neutron pulses, and then to compute the difference between these two or more measurements. As the logging tool is moved through the borehole, these difference measurements may be recorded in a conventional manner to indicate variations occurring as the tool passes different formations. Alternatively, separate recordings may be made of the intensities measured during the first and second measurement intervals subsisting between successive neutron pulses, and may be correlatively displayed on a common record so as to visually indicate the difference for each depth in the borehole.

Irrespective of how the ultimate computations are to be obtained and indicated, it will be apparent that a gating system is necessary which will operate in conjunction with the pulsating neutron source, and which will activate one or more detectors during two or more succeeding time intervals of precisely the same duration following each neutron pulse. Inasmuch as the neutron source is required to pulse as often as 5,000 times per second, it is clear that such a gating system must be very fast in reaction, as well as very precise in timing. Accordingly, the present invention disclosed herein is specifically adapted to meet these requirements of speed and precision, and also is adapted to provide data in a form requiring a minimum of cable conductors for transmitting such data to the surface of the earth.

Therefore, it is an object of the present invention to provide methods and apparatus for rapidly gating a radiation detector on and off during two preselected time intervals following each neutron pulse emitted by a neutron source which is being pulsed at a very high frequency.

It is also an object of the present invention to provide methods and apparatus for gating a radiation detector on and off a plurality of times in synchronism with each pulse of a rapidly pulsated neutron source, and to develop the output signals from the detector in a form requiring only one conductor for transmission to the surface of the earth.

These and other objects of the present invention will be apparent from the following description wherein reference is made to the figures of the accompanying drawings. In the drawings:

FIGURE 2 is a functional representation of one form of the present invention, which depicts a pulsed neutron generator, a radiation detector, and circuitry synchronized with the neutron generator for activating the detector at preselected time intervals following each pulse.

FIGURE 4 is a schematic representation of a portion of the circuitry depicted in FIGURE 2.

Figure 1:
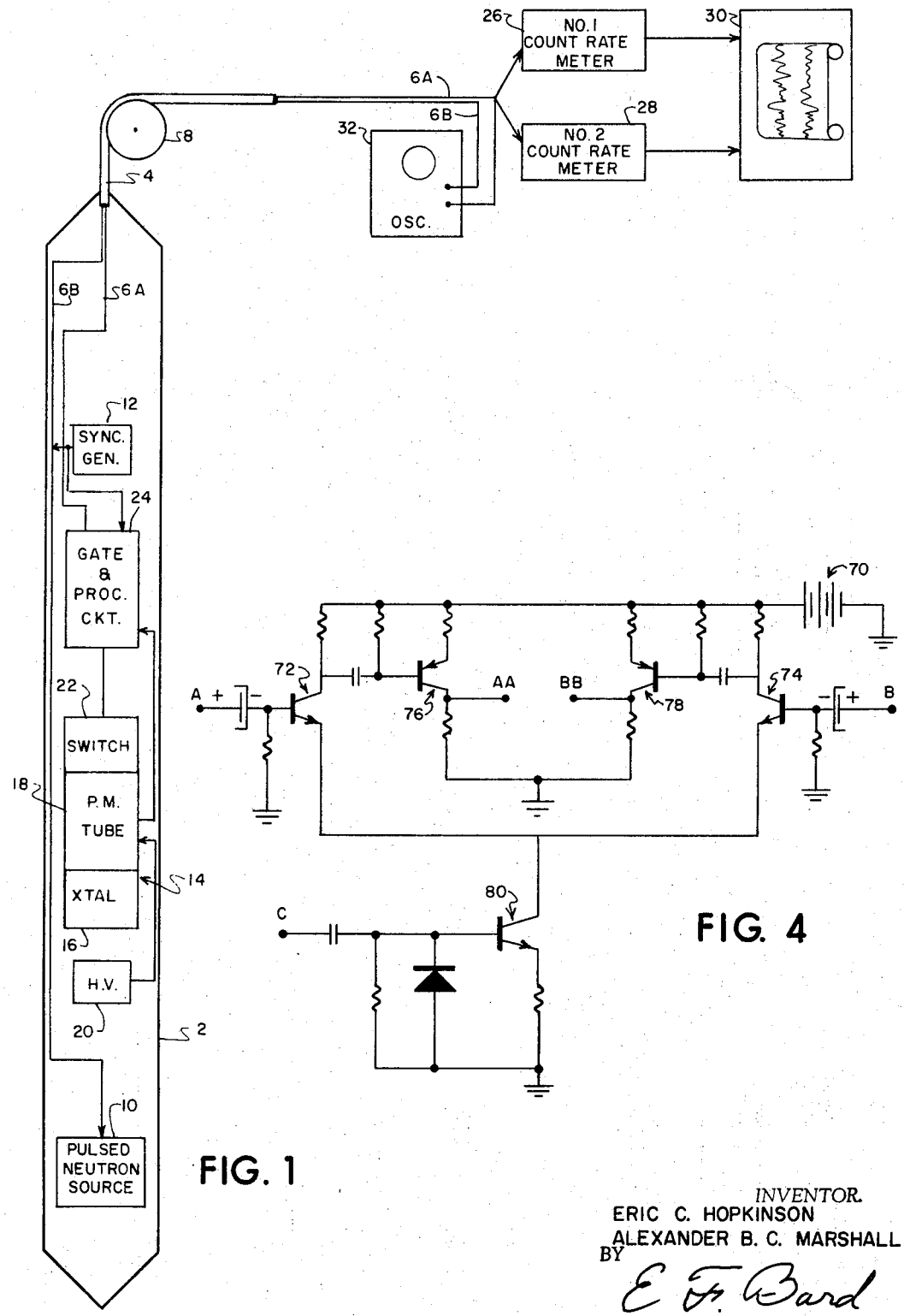
FIGURE 1 is a functional representation of a well logging system including a subsurface instrument having a pulsated neutron source and a gated radiation detector, a logging cable connecting the instrument to the earth's surface, and surface equipment for correlatively displaying indications obtained from the subsurface instrument.

Referring now to FIGURE 1. there may be seen a functional representation of a radioactivity well logging system, including an elongated pressure and fluid-resistant housing 2 which is adapted to be passed through a borehole, and which is suspended at one end of a conventional logging cable 4. The cable 4 may be passed over and supported by a measuring wheel 8 for generating an indication of the depth at which the housing 2 is located in the borehole. The measuring wheel 8 may be supported over the mouth of the borehole in any convenient manner, as by a traveling block supported by a derrick.

Included within the housing 2 is a neutron source 10, which may be a static atmosphere D-T ion accelerator of the type depicted in U.S. Patent No. 2,689,918, which issued Sept. 21, 1954, to A. H. Youmans. The housing 2 also contains a radiation detector 14, composed of a scintillation crystal 16, a photomultiplier tube 18, and a high voltage source 20. Further included within the housing 2 is a sync pulse generator 12 having its output of sync pulses connected to the neutron source 10, conductor 6B of cable 4, and a gating and signal processing circuit 24 which has its input terminal connected to the output of the detector 14. The output of the gating and signal processing circuit 24 is connected to conductor 6A of cable 4. At the surface of the earth, conductor 6A is connected to the inputs of the No. 1 count rate meter 26, the No. 2 count rate meter 28, and to one input terminal of a conventional oscilloscope 32. Conductor 6B, at the surface, is connected to another input terminal of the oscilloscope 32. The outputs of the No. 1 and No. 2 count rate meters are both connected to two separate pen drives (suggested but not depicted) of a conventional two-pen recorder 30.

During logging operations with the system depicted in FIGURE 1, the housing 2 is passed through the borehole in the earth while the sync generator 12 actuates the neutron source 10 so as to irradiate the interior of the borehole with a series of bursts or pulses of high energy neutrons. The sync generator 12 simultaneously actuates the gating and signal processing circuitry 24 to turn the detector 14 "on" during two preselected equal time intervals between each neutron pulse. Each radiation incident on the crystal 16 produces a scintillation of light in the crystal, and the photomultiplier tube 18 is arranged and adapted to respond (when activated) to each scintillation it "sees" by generating a corresponding voltage pulse. However, the switch 22 is adapted to prevent the photomultiplier tube 18 from producing any pulses except during the two intervals prescribed by the gating and signal processing circuitry 24. Any switching means may be used for the switch 22. However, it is preferable that the switch 22 be of a type which merely "paralyzes" an energized photomultiplier tube 18, rather than one which merely energizes or de-energizes it, and thus the switch 22 is preferably of the type depicted in the co-pending patent application filed Dec. 31, 1962, by E. C. Hopkinson, and having Ser. No. 248,568.

The gating and signal processing circuitry 24 is further adapted to produce a first group of positive data pulses corresponding to the detector 14 output pulses produced during the first time interval, and a second group of negative data pulses corresponding to the detector 14 output pulses produced during the second time interval. These positive and negative output pulses are transmitted to the surface by way of conductor 6A in the logging cable 4. At the surface, both groups of data pulses are applied to the No. 1 and No. 2 count rate meters 26 and 28. The No. 1 count rate meter 26 is adapted to respond only to positive pulses, and therefore it generates an output voltage which is functionally related to the intensity of radiation sensed by the detector 14 during the first of the two detection intervals. The No. 2 count rate meter 28 is adapted to respond only to negative pulses, and therefore it generates an output voltage which is functionally related to the intensity of radiation sensed by the detector 14 during the second of the two detection intervals. The outputs of the No. 1 and No. 2 count rate meters may be connected to respective pen drives of a conventional two-pen recorder 30. Alternatively, the two meter outputs may be connected to means for deriving an indication of the difference between the outputs of the No. 1 and No. 2 count rate meters 26 and 28, and this indication may be recorded by a single pen recording apparatus of conventional design.

Both conductors 6A and 6B may also be connected to respective input terminals of a conventional oscilloscope 32. Accordingly, the oscilloscope 32 will provide a visible relationship of the two groups of data pulses to the sync pulse, in order that the timing of the two preselected detection intervals may be properly obtained.

Referring now to FIGURE 2, there may be seen a representation of the neutron source 10 depicted in FIGURE 1, including a D-T accelerator tube 40, a high voltage generator 42 which may be an electrostatic Van de Graaff generator 42, and a pulsing apparatus 44 for causing the accelerator tube 40 to emit 14 mev. neutrons in bursts upon receipt of sync pulses from the sync pulse generator 12. As may be seen, each sync pulse is also applied to a sync signal cable driver circuit 46 having its output connected to conductor 6B, and to the No. 1 and No. 3 variable univibrator circuits 48 and 50. As will hereinafter be apparent, the Nos. 1, 2, and 4 variable univibrators 48, 52 and 54, need only be capable of limited adjustment. However, the No. 3 variable univibrator 50 is preferably adjustable during logging operations, and thus is preferably provided with suitable switching means (not depicted) such as a Ledex switch which may be actuatable from the surface of the earth.

The outputs of the No. 1 and No. 3 univibrators 48 and 50 are applied through No. 1 and No. 2 differentiating circuits 49 and 51, respectively, and through blocking diodes 45 and 47, respectively, to the Nos. 2 and 4 variable univibrator circuits 52 and 54, respectively, and to the "start" terminal of the bistable multivibrator 56. Diode 45 functions to pass outputs from the No. 1 differentiating circuit 49, but to block signals from the No. 3 differentiating circuit 51. The diode 47 functions to pass signals from the No. 3 differentiating circuit 51, but to block signals from the No. 1 differentiating circuit 49. The outputs of the No. 2 and No. 4 univibrators 52 and 54 are applied, respectively, to terminals A and B of the signal separator circuit 57, and through the Nos. 2 and 4 differentiating circuits 53 and 55, respectively, to the "stop" terminal of the bistable multivibrator 56. The output of the bistable multivibrator 56 is connected to the detector switch 22 which is connected to control the detector 14 as depicted in FIGURE 1.

The positive output pulses from the detector 14 are connected through a conventional pulse discriminator 58 to the C terminal of the signal separator circuit 57, which has its AA and BB output terminals connected, respectively, through the No. 1 and No. 2 scaler circuits 60 and 62, to the Nos. 1 and 2 input terminals of the detector signal cable driver 64. The No. 1 output terminal of the detector signal cable driver 64, which corresponds to its No. 1 input terminal, is connected directly to conductor 6A of the logging cable 4. The No. 2 output terminal of the cable driver 64, which corresponds to its No. 2 input terminal, is connected through an inverter 66 to the conductor 6A.

Figure 3:
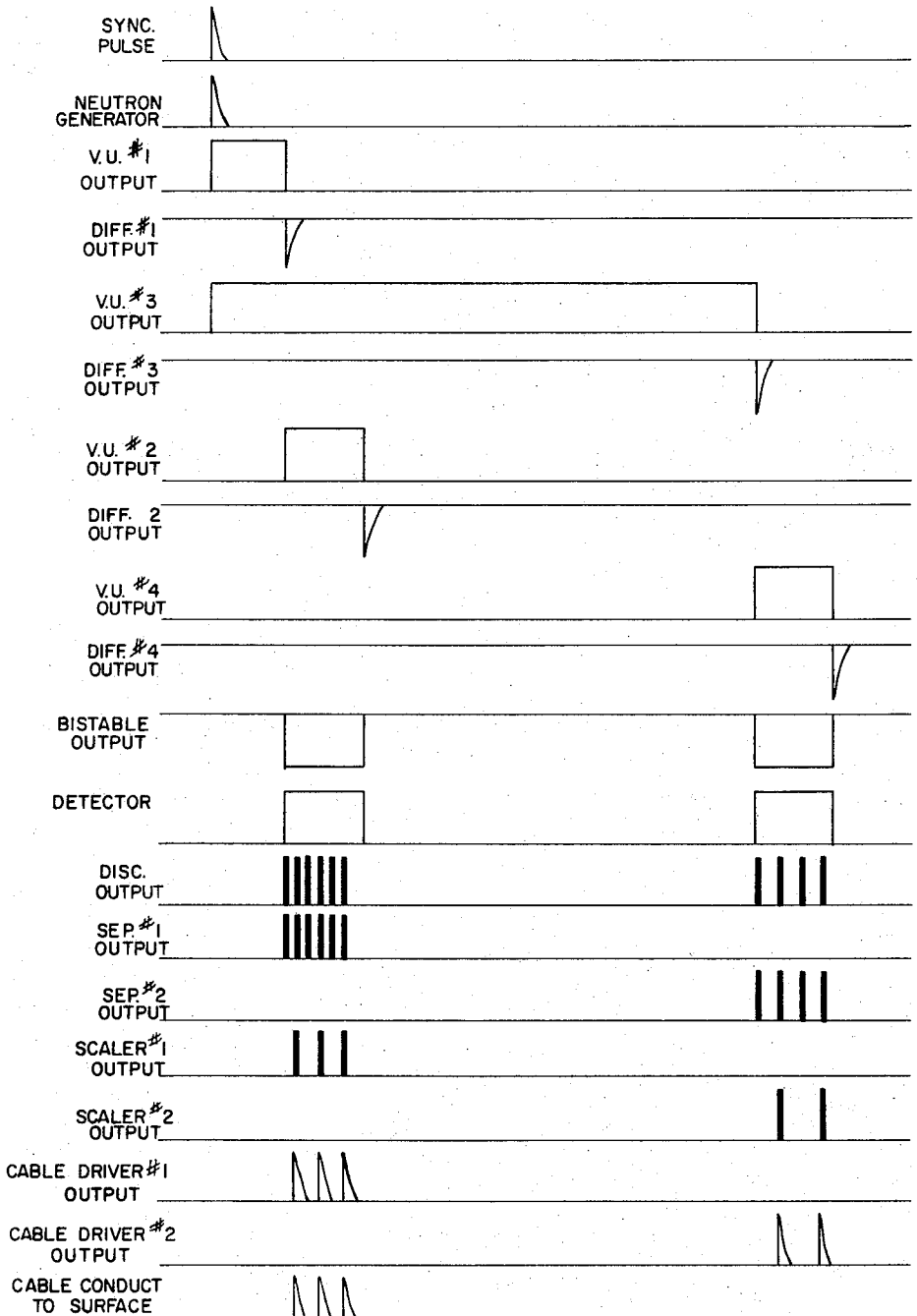
FIGURE 3 is a pulse diagram of the various pulses and signal outputs occurring within the circuitry depicted in FIGURE 2.

Referring now to FIGURE 3, there may be seen a schedule of the various pulses and signal outputs, in relation to each other, which are provided by the components of the circuitry depicted in FIGURE 2. As hereinbefore explained, the operating cycle of the logging system is initiated by the occurrence of a sync pulse from the sync generator 12. Each such sync pulse produces a concurrent pulse of fast neutrons, and triggers both the No. 1 and No. 3 variable univibrators 48 and 50. The No. 1 univibrator 48 produces a square wave positive output for a first predetermined time interval sufficient to permit slowing and capture of all of the neutrons in the borehole, whereupon the square wave terminates in a sharp negative kick or pulse provided by the No. 1 differentiating circuit 49 to energize both the No. 2 variable univibrator 52 and the bistable multivibrator 56. When energized, the bistable multivibrator 56 produces a negative square wave which is applied to the detector switch 22. The detector switch 22, in turn, applies an energizing positive square wave signal to the detector 14 for the duration of the signal from the bistable multivibrator 56.

The No. 2 univibrator 52, which was actuated by the differentiated output from the No. 1 univibrator 48 and No. 1 differentiating circuit 49, also produces a positive square wave output for a preselected time interval which establishes the first detection interval hereinbefore mentioned. This may be seen by the fact that the No. 2 differentiating circuit 53 produces a sharp negative pulse upon termination of the output of the No. 2 univibrator, and this negative pulse operates to de-energize the bistable multivibrator 56 which, in turn, operates to "close" the detector switch 22 and to terminate the first detection interval.

As may be seen in FIGURE 2, the undifferentiated square wave output from the No. 2 univibrator 52 is also applied to the A terminal of the signal separator circuit 57. It is the function of the signal separator circuit 57 to channel any pulses received at its C input terminal to its AA output terminal during the application of a signal to its A input terminal, and to channel pulses received at its C terminal to its BB output terminal during application of a signal at its B input terminal. Accordingly, all positive pulses generated by the detector 14 during the first detection interval will be channeled to the No. 1 scaler circuit 60, which operates to proportionately scale down the number of pulses (preferably by a factor of two), and to apply the scaled down positive pulses to the No. 1 input terminal of the detector signal cable driver circuit 64. Positive pulses received at its No. 1 input terminal are applied directly to conductor 6A, by the cable driver 64, by way of its corresponding No. 1 output terminal.

Referring again to FIGURES 2 and 3, it will be recalled that the sync pulse produced by the sync generator 12 also served to actuate the No. 3 variable univibrator 50 to produce a positive square wave output for a much longer predetermined time period than that of the No. 1 univibrator 48. When this long output terminates, the No. 3 differentiating circuit 51 provides a sharp negative pulse to start the No. 4 variable univibrator 54, and the bistable multivibrator 56 by way of the diode 47. It is the function of diode 47 to pass pulses produced by the No. 3 differentiating circuit 51, but to block those pulses from the No. 1 differentiating circuit 49 which would prematurely energize the No. 4 variable univibrator 54.

Upon being energized, however, the No. 4 univibrator 54 applies a positive square wave output to the B input terminal of the signal separator circuit 57, as well as to the No. 4 differentiating circuit 55 for a preselected time period which is preferably equal to the duration of the output of the No. 2 univibrator 52. In response to the signal on its B input terminal, the signal separator circuit 57 now sends the positive pulses produced by the again activated detector 14 to its BB output terminal, from which they pass to the No. 2 scaler circuit 62. The No. 2 scaler circuit 62 scales down the pulses, by the same factor as the No. 1 scaler circuit 60, and then passes the scaled down, but still positive, pulses to the No. 2 input terminal of the detector signal cable driver 64 which passes them through its No. 2 output terminal to an inverter circuit 66. The inverter circuit 66 functions to change all received positive pulses to pulses of negative polarity, before applying them to conductor 6A of the logging cable 4. In this manner, the negative pulses which correspond functionally to the radiations detected during the second detection interval, do not mix with the positive pulses which correspond to radiations detected during the first detection interval, and therefore only one cable conductor is required for transmitting both pulse groups to the surface.

Upon termination of the time interval corresponding to the second detection interval, the No. 4 univibrator 54 terminates its square wave output. At this instant, the No. 4 differentiating circuit 55 produces a sharp negative pulse, which stops the bistable multivibrator 56, to "close" the detector switch 22, and to return the detector 14 to its normally unresponsive state.

Referring now to FIGURE 4, there may be seen a schematic representation of the signal separator circuit 57 depicted in FIGURE 2. Those skilled in this art will recognize that the overall circuitry comprises two normally non-conducting amplifiers, which are rendered conductive by the positive square wave input signals provided by the Nos. 2 and 4 univibrator circuits 52 and 54. One amplifier circuit may be defined functionally as the circuitry between terminals A and AA, and including the input circuitry associated with terminal C. The other amplifier circuit may be functionally defined as the circuitry between terminals B and BB, and including the input circuitry associated with terminal C. The entire signal separator circuit 57 may be assumed to be energized by its power supply 70.

More particularly, when positive pulses from the detector 14 arrive at terminal C, they do not pass to either terminal AA or BB, inasmuch as both transistors 72 and 74 are preferably NPN type and are in a normally non-conducting state with respect to negative pulses from transistor 80, which is also preferably NPN. Accordingly, when a positive voltage is applied to either terminal A or B, negative pulses will pass to either transistor 76 or 78, respectively, which will apply related positive pulses to terminals AA or BB, respectively.

Figure 5:
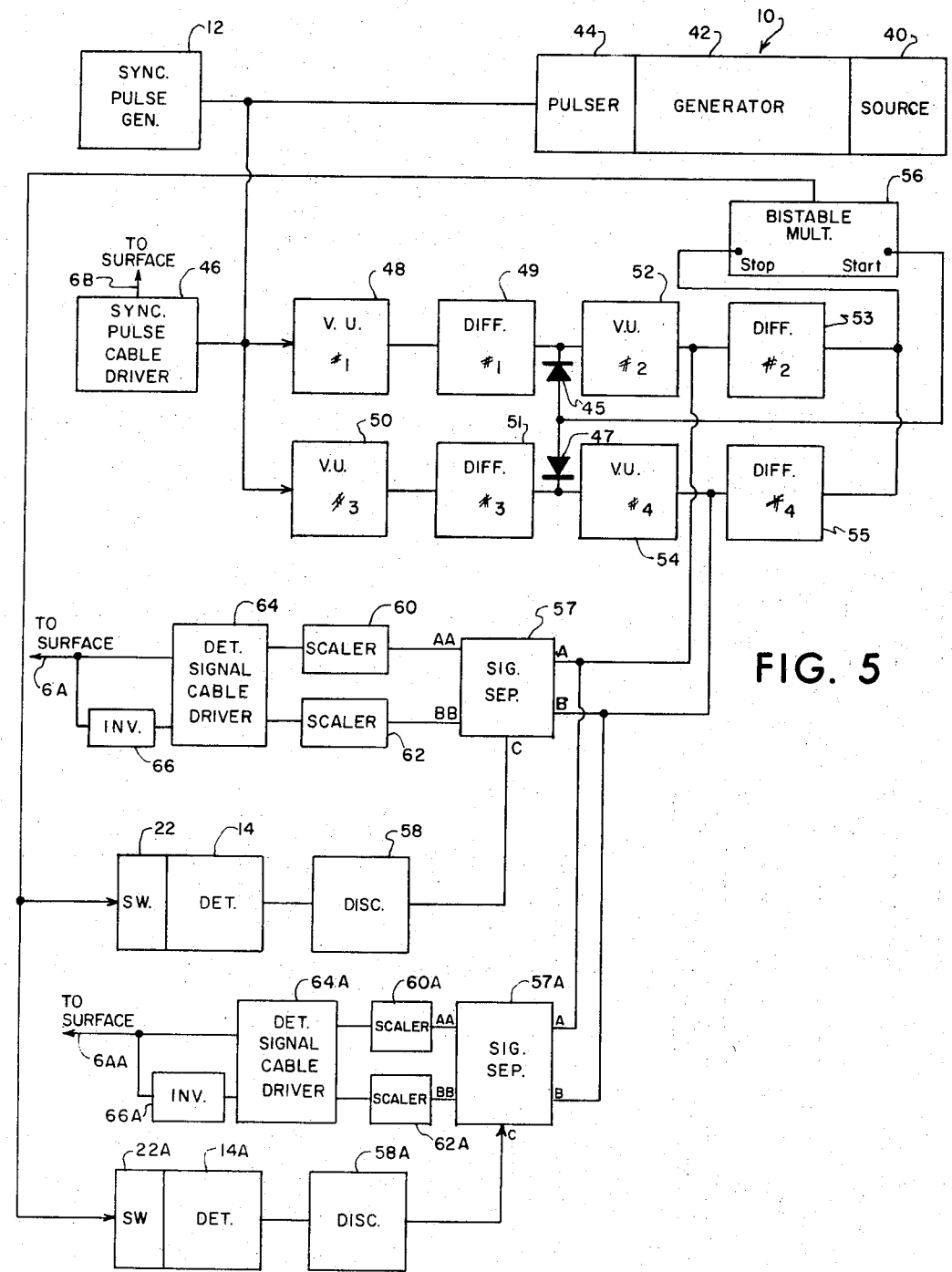
FIGURE 5 is a functional representation of another form of the circuitry depicted in FIGURE 2.

Referring now to FIGURE 5, there may be seen a modification of the circuitry depicted in FIGURE 2 wherein provision is made for the cycling of two radiation detector circuits in synchronism with the pulsation of the neutron source 10. In addition to the circuitry and components depicted in FIGURE 2, there may be seen a second detector 14A, detector switch 22A, and discriminator 58A interconnected with the output of the bistable multivibrator 56. The output of the second discriminator 58A is connected to the C terminal of a second signal separator circuit 57A having its A terminal interconnected between the output of the No. 2 univibrator 52 and the A terminal of the first signal separator circuit 57, and having its B terminal interconnected between the output of the No. 4 univibrator 54 and the B terminal of the first signal separator circuit 57.

The second signal separator circuit 57A is adapted to function exactly the same as the first signal separator circuit 57. Accordingly, it operates to channel output pulses from the second detector 14A, through its AA terminal during the first detection interval, and through its BB terminal during the second detection interval, simultaneously with and in the same manner as the first signal separator circuit 57. Inasmuch as the bistable multivibrator 56 activates both detectors 14 and 14A, the outputs from the second signal separator 57A will differ from the corresponding outputs from the first signal separator 57 only by the outputs of the two detectors 14 and 14A. Since both detectors 14 and 14A are activated and deactivated simultaneously, their outputs will differ only in the manner in which they are positioned with respect to the neutron source 10, or in the manner in which their inherent response to radiation differs.

For example, if both detectors 14 and 14A are made equally responsive to the same class of radiation, i.e., gamma rays, then their output signals will differ only as their spacings from the neutron source 10 differ. On the other hand, if the first detector 14 is made primarily responsive to gamma rays and the second detector 14A primarily responsive to epithermal or thermal neutrons, then their signals will differ even if they are spaced equally from the neutron source 10.

Figure 6:
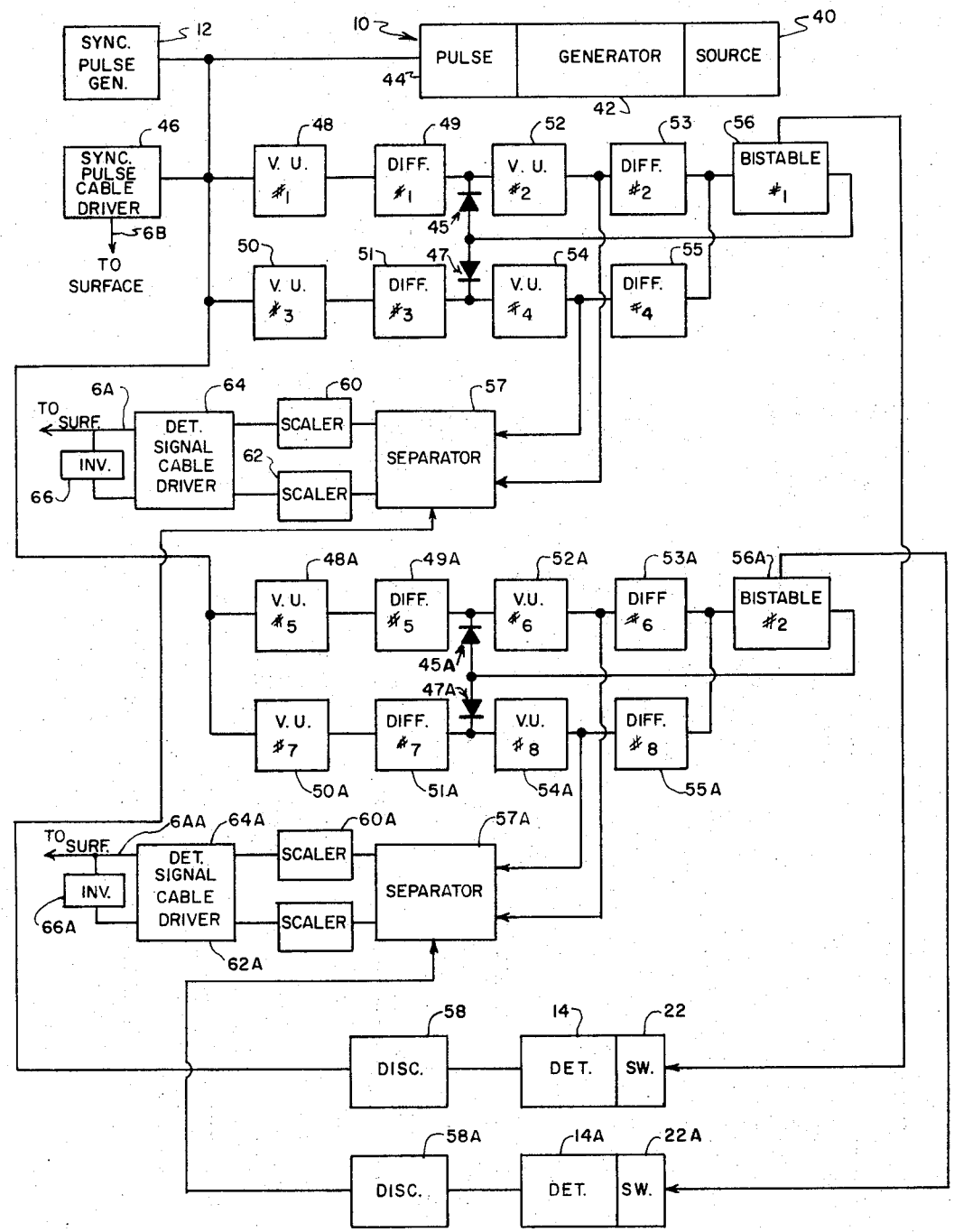
FIGURE 6 is a functional representation of a variation of the circuitry depicted in FIGURE 5.

In the circuit depicted in FIGURE 5, the duration and timing of the first and second detection intervals may be varied, not only with respect to the occasion of the neutron pulse but also with respect to each other. However, the first and second detection intervals for the first detector 14 will always be concurrent with the first and second detection intervals of the second detector 14A. Referring now to FIGURE 6, there may be seen a modified system which is adapted to permit selection of detection intervals for the second detector 14A which are different from those selected for the first detector 14.

In particular there is provided a second gating system for controlling the second detector 14A, including the Nos. 5–8 univibrators and differentiating circuits 49A–55A, and the No. 2 bistable multivibrator 56A, which are interconnected and adapted to function in the same manner as the Nos. 1–4 univibrators and differentiating circuits 49–55, and the No. 1 bistable multivibrator 56. However, all univibrators in the system are independently adjustable (although only the Nos. 3 and 7 univibrators 50 and 50A need be made remotely adjustable from the surface) and therefore the No. 2 bistable multivibrator 56A may be gated independently of the gating of the No. 1 bistable multivibrator 56.

Numerous other variations and modifications may obviously be made without departing from the concept of the present invention. Accordingly, it should be clearly understood that those forms of the present invention which are described herein and depicted in the accompanying drawings, are illustrative only, and are not intended to limit the scope of the invention.

What is claimed is:

1. In a radioactivity well logging system including a neutron source, a radiation detector, and pulsing means for intermittently actuating said source to produce a sequence of bursts of neutrons, the improvement in combination therewith comprising first gating means responsive to said pulsing means for rendering said detector responsive to incident radiations during a first predetermined interval between each of said bursts of neutrons, second gating means responsive to said pulsing means for rendering said detector responsive to incident radiations during a second predetermined interval between each of said bursts of neutrons and subsequent to said first predetermined interval, and signal separating means interconnected with said detector and said first and second gating means for separating signals indicative of incident radiations detected during said first predetermined interval from signals indicative of incident radiations detected during said second predetermined interval.

2. In a radioactivity well logging system including a neutron source, a radiation detector, and pulsing means for intermittently actuating said source to produce a sequence of bursts of neutrons, the improvement in combination therewith comprising first gating means responsive to said pulsing means for rendering said detector responsive to incident radiations during a first predetermined portion of the time interval defined by each of said bursts of neutrons, second gating means responsive to said pulsing means for rendering said detector responsive to incident radiations during a second predetermined portion of said interval defined by each of said bursts of neutrons and equal to and following said first portion, and signal separating means responsive to said first and second gating means and connected to said detector for separating and distinguishing signals produced by said detector during said second portion of said time interval from signals produced by said detector during said first portion of said time interval.

3. In a radioactivity well logging system including a subsurface instrument, surface measuring and recording equipment, and a logging cable having at least one conductor interconnecting said instrument and said surface equipment, said subsurface equipment also including a neutron source, a radiation detector, and pulsing means for intermittently actuating said source to produce a sequence of bursts of neutrons, the improvement in combination therewith comprising gating means located in said instrument and including a first gate responsive to said pulsing means for rendering said detector responsive to incident radiations during a first predetermined portion of the time interval defined by each of said bursts of neutrons, a second gate responsive to said pulsing means for rendering said detector responsive to incident radiations during a second predetermined portion of said interval defined by each of said bursts of neutrons and equal to and following said first portion, and signal separating means responsive to said first and second gates and connected to said detector for separating and distinguishing signals produced by said detector during one of said portions of said time interval from signals produced during the other of said portions and for connecting said signals produced during said portions to said conductor.

4. In a radioactivity well logging system including a neutron source, a radiation detector, and pulsing means for intermittently actuating said source to produce a sequence of bursts of neutrons, the improvement in combination therewith comprising means for rendering said detector responsive to incident radiations during at least two preselected equal time intervals between each of said bursts of neutrons, said means including a first gate responsive to said pulsing means for producing a first gate signal during a first preselected period, a second gate responsive to the termination of said first gate signal for producing a second gate signal during a second preselected period, a third gate responsive to said pulsing means for producing a third gate signal during a third preselected period greater than said first and second periods, a fourth gate responsive to the termination of said third gate signal for producing a fourth preselected gate signal equal to said second gate signal, switch means connected to said detector and responsive to the terminations of said first and third gate signals for assuming a first condition and responsive to the terminations of said second and fourth gate signals for assuming a second condition, signal separator means connected to receive signals from said detector for routing said detector signals to a first signal channel in response to said second gate signal and to a second signal channel in response to said fourth gate signal, and inverter means for reversing the polarity of said detector signals in said second channel with respect to the polarity of said detector signals in said first channel.

5. In a radioactivity well logging system including a subsurface instrument, surface measuring and recording equipment, and a logging cable having at least one conductor interconnecting said instrument and said surface equipment, said subsurface equipment further including a neutron source, a radiation detector, and pulsing means for intermittently actuating said source to produce a sequence of bursts of neutrons, the improvement in combination therewith comprising means also in said instrument for rendering said detector responsive to incident radiations during at least two preselected equal time intervals between each of said bursts of neutrons, said means including a first adjustable gate responsive to actuation of said pulsing means for producing a first gate signal during a first preselected period, a second adjustable gate responsive to the termination of said first gate signal for producing a second gate signal during a second preselected period, a third adjustable gate responsive to actuation of said pulsing means for producing a third gate signal during a third preselected period greater than said first and second periods, a fourth adjustable gate responsive to the termination of said third gate signal for producing a fourth gate signal during a fourth preselected period equal in duration to said second preselected period, switch means responsive to the terminations of said first and third gate signals for assuming a first condition and responsive to the terminations of said second and fourth gate signals for assuming a second condition, said switch means being connected to said detector to render said detector responsive to incident radiations when said switch is in said first condition and unresponsive to incident radiations when said switch is in said second condition, signal separating means connected to said detector and responsive to said first and second gating means for separating and distinguishing signals produced by said detector during one of said time intervals from signals produced during the other of said time intervals and for connecting said separated and distinguished signals to said conductor in said logging cable for transmission to said surface equipment.

6. In a radioactivity well logging system including a subsurface instrument, surface measuring and recording equipment, and a logging cable having first and second conductors interconnecting said instrument and said surface equipment, said subsurface instrument further including a neutron source, first and second normally unresponsive detectors, and pulsing means for intermittently actuating said source to produce a sequence of bursts of neutrons, the improvement in combination therewith comprising means for rendering said detectors responsive to incident radiations during preselected portions of the time intervals defined by said bursts of neutrons, said means including first gating means responsive to said pulsing means for rendering said detectors responsive during a first preselected portion of each of said time intervals, second gating means responsive to said pulsing means for rendering said detectors responsive during a second preselected portion of each of said time intervals, and signal separating means connected to said detectors and responsive to said first gating means for separating and distinguishing signals produced by said detectors during said first portion from signals produced during said second portion and for connecting signals produced by said first detector to said first conductor and signals produced by said second detector to said second conductor.

7. In a radioactivity well logging system including a subsurface instrument, surface measuring and recording equipment, and a logging cable having first and second conductors interconnecting said instrument and said surface equipment, said subsurface instrument further including a neutron source, first and second normally unresponsive detectors, and pulsing means for intermittently actuating said source to produce a sequence of bursts of neutrons, the improvement in combination therewith comprising means for rendering said first detector responsive to incident radiations during first and second preselected portions of the time intervals defined by said bursts of neutrons and for rendering said second detector responsive to incident radiations during third and fourth preselected portions of said time intervals, said means including first gating means responsive to said pulsing means for rendering said first detector responsive during said first preselected portions of said time intervals, second gating means responsive to said first gating means for rendering said first detector responsive during said second preselected portions of said time intervals, third gating means responsive to said pulsing means for rendering said second detector responsive during said third preselected portions of said time intervals, fourth gating means responsive to said third gating means for rendering said second detector responsive during said fourth preselected portions of said time intervals, first signal separating means connected to said first detector and responsive to said first and second gating means for separating and distinguishing the signals produced by said first detector during ones of said first and second preselected portions of said time intervals from the signals produced by said first detector during the others of said first and second preselected portions of said time intervals and for connecting said signals from said first detector to said first conductors, and second signal separating means connected to said second detector and responsive to said third and fourth gating means for separating and distinguishing signals produced by said second detector during ones of said third and fourth preselected portions of said time intervals from the signals produced by said second detector during the others of said third and fourth preselected portions of said time intervals and for connecting said signals from said second detector to said second conductor.

8. The improvement described in claim 5, wherein said signal separating means comprises a first normally non-conducting amplifier having its input interconnected with said detector and its output with said conductor and being further interconnected with said second gate in a manner to be rendered conductive by said second gate signal during said second preselected period, a signal inverter means having an output connected to said conductor and having an input, and a second normally non-conducting amplifier having its input interconnected with said detector and its output connected with the input of said inverter and being further interconnected with said fourth gate in a manner to be rendered conductive by said fourth gate signal during said fourth preselected period.

9. The improvement described in claim 6, wherein said signal separating means comprises a first normally non-conducting amplifier having its input interconnected with said first detector and its output interconnected with said first conductor and being further interconnected with said first gating means in a manner to be rendered conductive during said first preselected portion of each of said time intervals, a first signal inverter having an input and having an output interconnected with said first conductor, a second normally non-conducting amplifier having its input interconnected with said first detector and its output interconnected with said input of said first inverter and being further interconnected with said second gating means in a manner to be rendered conductive during said second preselected portion of each of said time intervals, a third normally non-conducting amplifier having its input interconnected with said second detector and its output interconnected with said second conductor and being further interconnected with said first gating means in a manner to be rendered conductive during said first preselected portions of each of said time intervals, a second signal inverter having an input and having an output interconnected with said second conductor, and a fourth normally non-conducting amplifier having its input interconnected with said second detector and its output interconnected with said input of said second inverter and being further interconnected with said second gating means in a manner to be rendered conductive during said second preselected portion of each of said time intervals.

10. The improvement described in claim 7, wherein said first signal separating means comprises a first normally non-conducting amplifier having its input interconnected with said first detector and its output interconnected with said first conductor and being further interconnected with said first gating means in a manner to be rendered conductive during each of said first preselected portions of said time intervals, a first signal inverter having an input and having an output interconnected with said first conductor, a second normally non-conductive amplifier having its input interconnected with said first detector and its output interconnected with said input of said first inverter and being further interconnected with said second gating means in a manner to be rendered conductive during each of said second preselected portions of said time intervals, a third normally non-conducting amplifier having its input interconnected with said second detector and its output interconnected with said second conductor and being further interconnected with said third gating means in a manner to be rendered conductive during each of said third preselected portions of said time intervals, a second signal inverter having an input and having an output interconnected with said second conductor, and a fourth normally non-conducting amplifier having its input interconnected with said second detector and its output interconnected with said input of said second inverter and being further interconnected with said fourth gating means in a manner to be rendered conductive during each of said fourth preselected portions of said time intervals.

References Cited

UNITED STATES PATENTS 3,116,417  12/1963  Orr et al. _____ 250—71.5
3,133,195  5/1964  Jones et al. _____ 250—71.5 X ARCHIE R. BORCHELT, *Primary Examiner.*

RALPH G. NILSON, *Examiner.*

A. B. CROFT, *Assistant Examiner.*